United States Patent
Kochura et al.

(10) Patent No.: US 11,163,522 B2
(45) Date of Patent: Nov. 2, 2021

(54) FINE GRAIN HAPTIC WEARABLE DEVICE

(71) Applicant: International Business Machines Corporation, Armonk, NY (US)

(72) Inventors: Nadiya Kochura, Bolton, MA (US); Anh Uong, Topsfield, MA (US); Daniel Manning, Winthrop, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/582,465

(22) Filed: Sep. 25, 2019

(65) Prior Publication Data

US 2021/0089261 A1 Mar. 25, 2021

(51) Int. Cl.

| G10H 1/047 | (2006.01) |
|---|---|
| H04R 3/00 | (2006.01) |
| G06F 3/16 | (2006.01) |
| G10L 15/22 | (2006.01) |
| G10L 15/18 | (2013.01) |
| G08B 6/00 | (2006.01) |
| G10L 25/51 | (2013.01) |
| H04R 1/40 | (2006.01) |
| H04N 5/247 | (2006.01) |

(52) U.S. Cl.
CPC ............... *G06F 3/165* (2013.01); *G08B 6/00* (2013.01); *G10L 15/18* (2013.01); *G10L 15/22* (2013.01); *G10L 25/51* (2013.01); *H04N 5/247* (2013.01); *H04R 1/406* (2013.01); *H04R 3/005* (2013.01)

(58) Field of Classification Search
CPC ............ H04R 2225/39; H04R 2225/41; H04R 2430/23; H04R 2460/07; H04R 2225/36
USPC ..................................... 381/312–313, 92, 62
See application file for complete search history.

(56) References Cited

U.S. PATENT DOCUMENTS 3,814,856 A * 6/1974 Dugan ................... H04R 27/00
381/57
10,130,516 B2 11/2018 Li et al.
(Continued)

FOREIGN PATENT DOCUMENTS

CN 201903695 U 7/2011
DE 102007025861 A1 12/2008
(Continued)

OTHER PUBLICATIONS

Bruguier et al., "Learning Personalized Pronunciations for Contact Name Recognition," Interspeech 2016, 5 pages. https://research.google.com/pubs/archive/45415.pdf.
(Continued)

*Primary Examiner* — George C Monikang
(74) *Attorney, Agent, or Firm* — Nolan M. Lawrence (57) ABSTRACT

An audio stream is received from one or more of a plurality of microphones. A relationship between the audio stream and a user is detected. The detection is based on the audio stream from the plurality of microphones. The user wears a wearable device that includes the plurality of microphones. A direction of the audio stream is determined. The determination is based on the audio stream from the plurality of microphones. An alert to the user wearing the wearable device is output. The output is based on the direction of the audio stream. The output is also based on the relationship between the audio stream and the user.

20 Claims, 4 Drawing Sheets

(56) References Cited

U.S. PATENT DOCUMENTS

| | | | | |
|---|---|---|---|---|
| 2007/0030984 A1* | 2/2007 | Gotfried | ................ | H04N 7/147 |
| | | | | 381/122 |
| 2015/0149159 A1* | 5/2015 | Dimitriadis | ............ | G10L 15/22 |
| | | | | 704/226 |
| 2015/0358717 A1* | 12/2015 | Johnston | ................ | H04R 1/028 |
| | | | | 381/370 |
| 2016/0165340 A1* | 6/2016 | Benattar | ............. | H04R 29/006 |
| | | | | 381/92 |
| 2017/0025042 A1* | 1/2017 | Chen | .................... | G09B 21/009 |
| 2017/0060850 A1 | 3/2017 | Lewis et al. | | |
| 2018/0192208 A1 | 7/2018 | Zhang et al. | | |
| 2018/0193198 A1* | 7/2018 | Li | .............................. | G01S 3/80 |

FOREIGN PATENT DOCUMENTS

| | | |
|---|---|---|
| EP | 2797079 B1 | 11/2015 |
| WO | 2004114107 A1 | 12/2004 |
| WO | 2018053225 A9 | 3/2018 |

OTHER PUBLICATIONS

The Family Hearing Center, "Suggestions for Communication with Hearing Impaired Persons," The Treatment and Learning Centers, Apr. 2012, 2 pages.

Precision Microdrives, "How to Drive a Vibration Motor With Arduino and Genuino," Tech Blog, printed Jul. 22, 2019, 5 pages, https://www.precisionmicrodrives.com/content/how-to-drive-a-vibration-motor-with-arduino-and-genuino/.

Vasilescu et al. "Multilinear Image Analysis for Facial Recognition," Object Recognition Supported by User Interaction for Service Robots, 2002, pp. 511-514, IEEE, DOI: 10.1109/ICPR.2002.1048350.

Wang et al. "Processing Distributed Internet of Things Data in Clouds," IEEE Cloud Computing, vol. 2, Issue 1, Jan.-Feb. 2015, pp. 76-80, DOI: 10.1109/MCC.2015.14.

Yang, J., "How an Echo Device Could Locate Snaps, Claps, and Taps," Alexa Blogs, Oct. 4, 2018, 5 pages. https://developer.amazon.com/blogs/alexa/post/78bb70b5-66bc-4d47-bb6d-995d514491c8/snaps-claps-or-taps-could-tell-household-devices-where-in-a-room-a-customer-is.

Cech et al., Active-Speaker Detection and Localization with Microphones and Cameras Embedded into a Robotic Head, 2013 13th IEEE-RAS International Conference on Humanoid Robots (Humanoids), 2013, pp. 203-210, IEEE.

Chakravarty et al., "Cross-modal Supervision for Learning Active Speaker Detection in Video," arXiv:1603.08907v1, Cornell University, Mar. 29, 2016, pp. 1-16.

* cited by examiner

FINE GRAIN HAPTIC WEARABLE DEVICE

BACKGROUND

The present disclosure relates to notifications for sounds, and more specifically, to identifying sounds from an audio stream and notifying relevant individuals.

Augmented devices may permit users to see and hear in the world in a more advanced way. Augmented devices may provide enhanced performance of audio and visual information; audio and visual information not capable of being perceived by certain individuals. Augmented devices may only provide coarse information to individuals, leaving the individuals with lots of additional tasks to use these devices.

SUMMARY

According to embodiments disclosed are a system, method, and computer program product. An audio stream is received from one or more of a plurality of microphones. A relationship between the audio stream and a user is detected. The detection is based on the audio stream from the plurality of microphones. The user is wearing a wearable device that includes the plurality of microphones. A direction of the audio stream is determined. The determination is based on the audio stream from the plurality of microphones. An alert to the user wearing the wearable device is output. The output is based on the direction of the audio stream. The output is also based on the relationship between the audio stream and the user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While embodiments of the invention are amenable to various modifications and alternative forms, specifics thereof have been shown by way of example in the drawings and will be described in detail. However, the invention is not limited to the particular embodiments described. On the contrary, the intention is to cover all modifications, equivalents, and alternatives falling within the spirit and scope of the invention.

DETAILED DESCRIPTION

Aspects of the present disclosure relate to notifications for sounds, more particular aspects relate to identifying sounds from an audio stream and notifying relevant individuals. While the present disclosure is not necessarily limited to such applications, various aspects of the disclosure may be appreciated through a discussion of various examples using this context.

Augmented reality devices (augmented devices) may be devices worn by users to augment the natural senses of an individual. For example, augmented glasses may permit an individual to see greater distances. In another example, augmented glasses may provide a heads-up display (HUD) that overlays relevant information to a user, such as notifications from a computer or text messages from a smartphone.

Augmented devices are not limited to devices that increase visual perception of users. For example, certain individuals may be unable to work in a commercial factory and hear noises such as falling equipment or dangerous moving vehicles. In another example, a person may not be able to hear other people talking in a large crowd. In yet another example, a person with a hearing disability may not hear someone talking behind them. Augmented audio devices may provide the individuals in the above examples with the ability to determine audio of the world as it relates to them.

Wearable devices may be devices that include electronic, computer, or other advanced systems (e.g., virtual reality headsets, hearing aids, augmented devices) and are configured to be worn by a user. The user may benefit from the wearable device by receiving more information such as audio streams or video streams.

Wearable devices may be limiting in some situations. In some situations, wearable devices may be bulky or large. The bulk of many wearable devices may make it difficult for users to use them throughout the day as they become painful to wear, necessitating in some situations, lengthy breaks or limited usage. In some situations, wearable devices may require connection with an outside computing system, such as a smartphone. This may be limiting in areas that restrict the use of smartphones. Even in situations that may allow cellphones, there are other drawbacks. For example, wearable devices that interface through smartphones may require users to stop, look down at their smartphone, and read it. The act of looking at the smartphone may cause distraction and could, in some situations, be dangerous (e.g., in a factory).

In some situations, wearable devices may cause other forms of discomfort for users. For example, hearing aids may draw attention to a person that is hard of hearing or with a hearing disability. The person may have practiced the ability to read lips and function without a hearing aid, and the idea of wearing a hearing aid may cause stigmatization. In some situations, wearable devices may be integrated into a headset worn by a user. The headset may be ungainly and have integrated video cameras that may make other people around the user uncomfortable. Certain wearable devices may, in some situations, have only one or two vibrating motors that only provide course grain feedback to a user. The user may find the feedback jarring from a limited number of vibrating motors. The user may find the feedback complicated or difficult to understand in that a limited number of vibrating motors may need to provide complex patterns to a user.

An FGH system may provide improvements in augmenting the senses of a user. The FGH system may be implemented in a standalone device or as a plurality of devices. The FGH system may create a streamlined process for alerting the user. An FGH system may include a plurality of nodes that communicate with each other using: a framework such as an Internet of Things (IoT) framework, a personal area network, or other relevant communication technology. The FGH system may be a wearable device that integrates the plurality of nodes for notifying a user wearing the wearable device (user). Each of the nodes may include haptic feedback devices and microphones. The nodes may each also include processors to determine the location of sounds and audible words (audio streams). The alerts may be customized by a user including: only the wearable device vibrates, the intensity or pattern of vibration, sending an alert to a smartphone, or some combination.

The FGH system may provide more intuitive information to a user by providing an alert to a user. The alert may include the direction of an audio stream to the user. The alert may be in the form of haptic feedback on the body of the person and in a direction that corresponds to the source of the sound. This may be beneficial when the user is not facing the source of the sound (e.g., a person to their side calling to them). The output of the FGH may be in 360 degrees around the front, back, and sides of the user. The resolution of the FGH may indicate a direction that corresponds to only a few degrees (e.g., each node of a wearable may represent seven degrees). The FGH system may be worn by a person without being placed on or near an ear. For example, a person having headphones on and listening to music may be providing feedback with the FGH system to another part of the body, such as the waist or neck.

The nodes may use the IoT framework to communicate with each other and determine the location of a sound and to provide detailed feedback as to the direction of the sound in relation to the user. The IoT framework may include encrypted communication that is an effective communication protocol (e.g., a secured protocol to communicate with a mobile device (e.g., a smartphone), a protocol to communicate with optionally worn augmented reality glasses). In some embodiments, the FGH system may leverage the IoT framework to connect to and communicate with other IoT devices. The other IoT devices may communicate information such that the FGH system may use to help locate audio streams. For example, a moisture sensor may communicate that the kitchen floor is wet near an open window, and this information may be provided to the user through the FGH system. The other IoT devices may be IoT home devices that the FGH system may leverage to alert a user when someone is at the door or if a bad actor is trying to break into a home or office of the user.

The FGH may also include a plurality of cameras that may record visual data (e.g., pictures, video) in certain settings. The cameras of the FGH can be activated based on the context. For example, based on the location detected, the cameras will stream video. The cameras may also not be permitted to turn on in public settings but be allowed for classrooms or office settings. The camera functionality of the FGH could also use be triggered based on voice recognition of a speaker if there is a relationship with the user of the wearable device. In some embodiments, an authentication mechanism, such as facial recognition, may identify a speaker and allow a video feed based on the relationship to the user.

Figure 1:
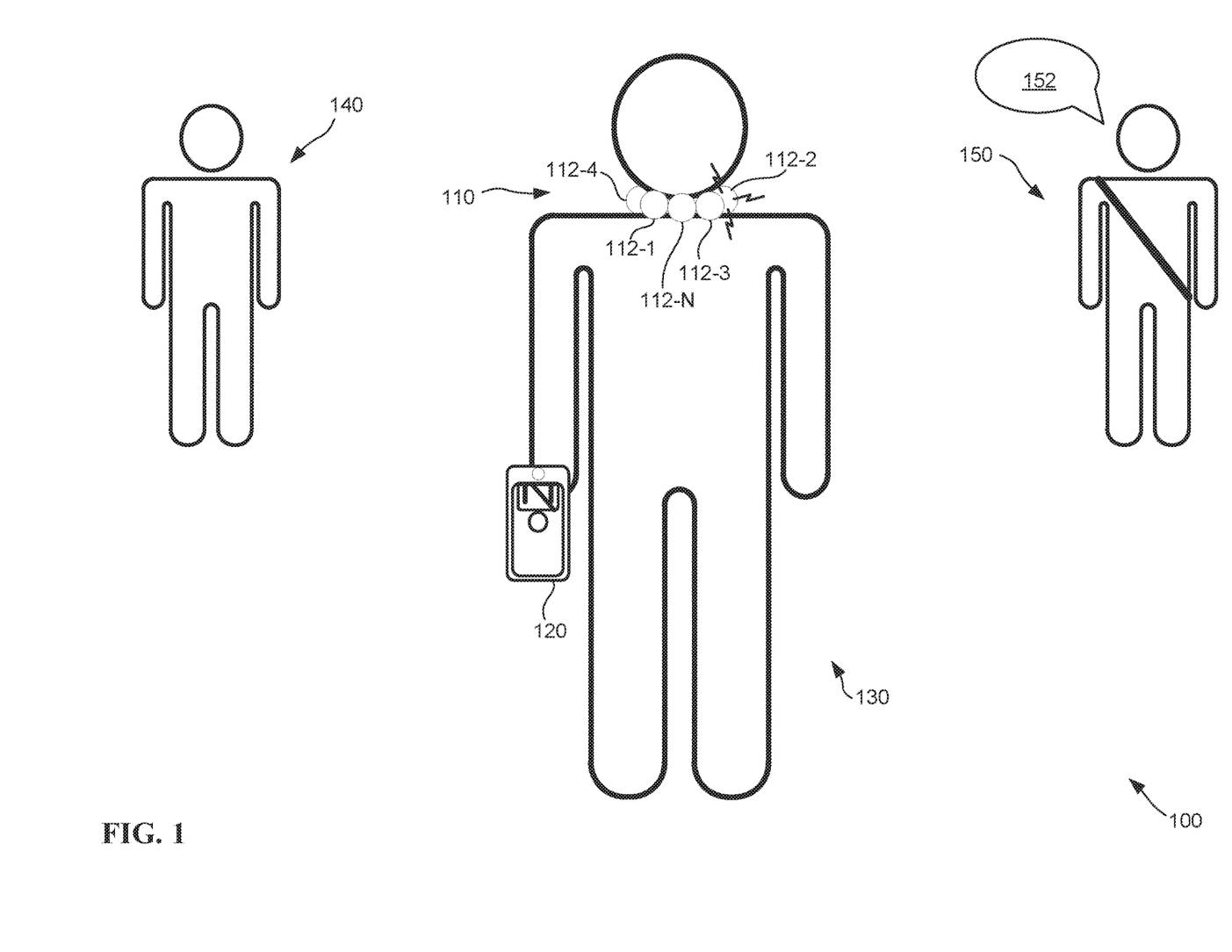
FIG. 1 depicts an example fine grain haptic (FGH) system including a wearable device consistent with some embodiments of the disclosure.

FIG. 1 depicts an example FGH system 100 including a wearable device 110 consistent with some embodiments of the disclosure. The wearable device 110 may provide fine grain haptic feedback to a user 130. The wearable device 110 may comprise a plurality of nodes 112-1, 112-2, 112-3, 112-4, to 112-N (collectively 112). The plurality of nodes 112 may be configured to operate individually to provide more intuitive information to a user. The wearable device 110 may provide fine grain information about the direction or source of an audio stream, such as a sound of a falling piece of equipment or audible words. The wearable device 110 may provide enhanced safety in dangerous environments, such as when operating loud machinery. The wearable device 110 may reduce confusion when navigating certain real-world situations, such as providing a pinpoint location of audio streams to a user of the wearable device.

The wearable device 110 may communicate to a user by notifying the user of various audio streams. The wearable device 110 may output an alert to the user wearing the wearable device. The alert may include the direction of an audio stream, such as the direction of the audio stream related to the user. For example, each node 112 of the plurality may include a microphone for detecting, hearing, and recording audio streams. Each node 112 may also include a haptic device for providing feedback as to the direction of an audio stream. For example, node 112-1 may provide haptic feedback (e.g., a vibration, a tap, a shake) to a user when a sound is coming from the right side and to the front of the user. In some embodiments, each node 112 may also include a plurality of video cameras for recording and capturing visual data, such as images and video. Each node 112 may perform facial recognition on the visual data captured by the plurality of video cameras (e.g., identifying the person that provided audible words).

In some embodiments, the FGH system 100 may also include a secondary device 120. For example, the wearable device 110 may communicate with an augmented reality headset by providing a visual representation of the audio stream. The wearable device 110 may be configured to perform text generation to generate an alert in the form of visual text that is provided to the augmented reality headset. The generated text may include key phrases such as "loud noise behind you" or "beware to the back and right" for display to the user.

Now described is an example scenario of using the FGH system 100, consistent with some embodiments. A user 130 may be navigating a large crowd in an office location. The large crowd at the office location may include a co-worker 140 and a security official 150. The co-worker 140 and the security official 150 may know the user 130, as they work together. The user 130 may have a hearing disability and is capable of reading lips when the user is able to look at other people.

Based on the location being an office, the user 130 may permit the wearable device 100 to process audible language. The ability to process audible language may be triggered based on the wearable device 110 communicating with an IoT location device (not depicted). The IoT location device may broadcast the location of the user and the wearable device 110 to the wearable device. The plurality of nodes 112 may periodically (e.g., every few 100 milliseconds) monitor for and receive audio streams. The user 130 may have just finished discussing a work project with the co-worker 140. During the discussion the user 130 may have set down one or more of his possessions (e.g., a glass of water).

As the user 130 walks away from the co-worker 140, the security official 150 may have noticed the possession of user 130. In response, the security official 150 may call out "hey, you forgot this" to the user 130. The wearable device 110 may process this audio stream and perform natural language processing on the audible words of the audio stream. Based on the direction of the words spoken by the security official 150, node 112-2 (located on the back of the left shoulder of user 130) of wearable device 110 may be triggered to output an alert to the user. The alert may be in the form of a haptic sensation on the back of the left shoulder of user 130 and may assist user 130 in determining that there is something behind him and to his left that he should prompt him to respond.

Figure 2A:
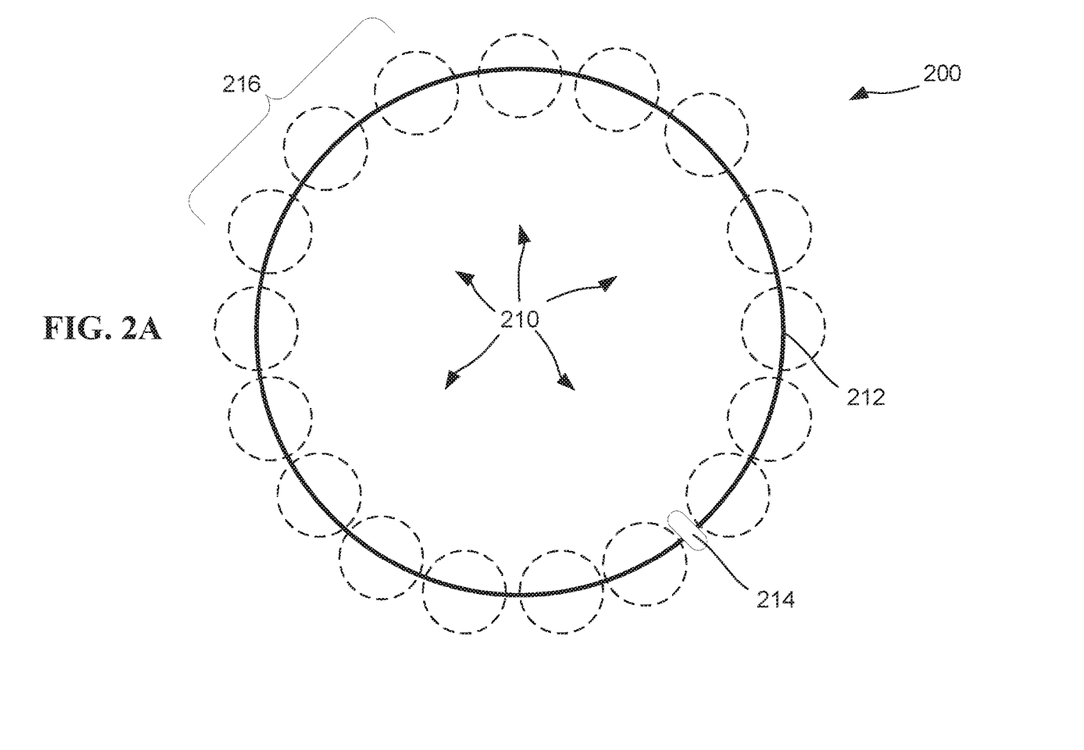
FIG. 2A depicts an example wearable device consistent with some embodiments of the disclosure.

The wearable device 110 may include a plurality of cameras in one or more of the plurality of nodes 112. Contemporaneously, a camera in node 112-2 may capture visual data, including an image of the security officer 152. The wearable device 110 may communicate with the secondary device 120 (e.g., a smartphone) and provide an alert to the secondary device. The alert may include an image capture from the visual data of node 112-2 or from a camera in one of the adjacent nodes (e.g., node 112-3 pointing to the side of user 130). The visual data may be in the form of a contact photo of the security official 150. The visual data may include a representation of the phrase processed from the audio stream, such as "you forgot" parsed from the audible words FIG. 2A depicts an example wearable device 200 consistent with some embodiments of the disclosure and may represent an example of the wearable device 110 discussed above. Wearable device 200 may be configured as an FGH device as part of an FGH system capable of providing high resolution haptic feedback to a user based on the direction of audio streams in relation to a user wearing the wearable device. Wearable device 200 may include the following: a plurality of nodes 210, which may be an example of the plurality of nodes 112 discussed above, for processing audio streams; a band 212 configured to link the plurality of nodes 210, and an interface 214. The plurality of nodes 210 (e.g., five nodes, twelve nodes, thirty nodes); each node of the plurality may be capable of providing feedback to a user to alert the user.

Interface 214 may be a power port or plug for accepting power through a physical cable for providing power (charging) wearable device 200. Interface 214 may be a contact-based charging interface for wirelessly charging wearable device 200. Interface 214 may be configured with a serial bus or other relevant technology for communication between wearable device 200 and a computer system (not depicted).

Wearable device 200 may also include an outer cover (not depicted). The outer cover may provide benefits in that it may hide the plurality of nodes 210. For example, a nylon or cloth fabric may comprise the outer cover, and may provide some dampening, such that wearable device 200 has a more continuous outer surface. The outer cover may motivate a user to wear the device over clothing or around the head (e.g., as a headband). The outer cover may be made of a thin substance having a permeable surface. The construction of the outer surface may permit the the reception of audio streams from the world around the user wearing the wearable device 200. The construction of the outer surface may permit the transmission of haptic feedback through the outer cover to the user.

The plurality of nodes 210 may be of a relatively small size (e.g., under 2 cm in diameter) and weight (e.g., under 284 grams). The diminutive size of plurality of nodes 210, may make the user 130 feel more comfortable as the wearable device 200 can be discretely worn. Each of the plurality of nodes 210 may be configured to individually listen for and receive an audio stream (e.g., based solely on processing located within each node of the plurality).

Each of the plurality of nodes 210 may be configured to alert a user by determining the location of an audio stream that may be relevant to the user. For example, a subset of three nodes 216 of the plurality of nodes 210 each node 210 may receive an audio stream representative of a person talking. The subset 216 may communicate with each other through a personal area network. Each node 210 of the subset 216 may process the received audio stream by determining that the audio stream is related to the user wearing the wearable device 200 (e.g., by performing natural language processing on the audio stream). Each node 210 of the subset 216 may also determine the location of the audio stream in relation to the user of the wearable 200. Each node 210 of the subset 216 may determine the location by comparing the timing of receipt of the received audio stream or the volume of the received audio stream.

The band 212 may be of a semi-stretch or elastic material configured to adjust in size. In some embodiments, the wearable device 200 may be secured around the user. For example, a headband around the head, a necklace around a neck, a waistband around a waist, a wearable around a chest. The band 212 may include a wired network for facilitating wireless communication between the plurality of nodes 210. The band 212 may facilitate wearing of the wearable device 200 on a comfortable body part such that any sensitive areas like the temples of the head are not disturbed. The band 212 along with the plurality of nodes 210 may be decorative in appearance, such as a string (the band 212) of pearls (the nodes 210).

Figure 2B:
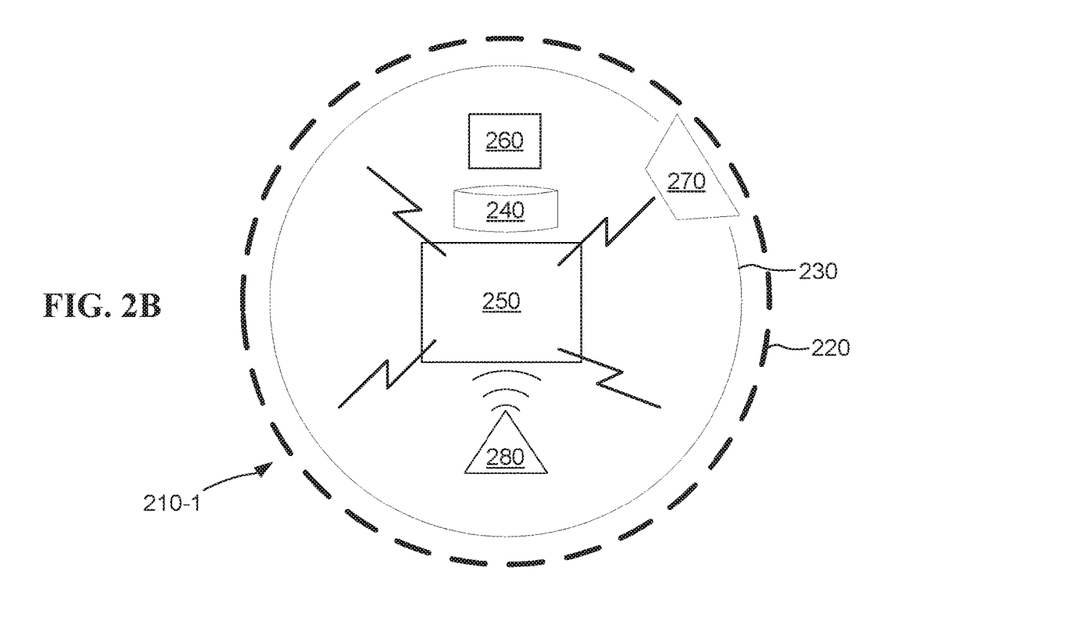
FIG. 2B depicts an example node of a wearable device consistent with some embodiments of the disclosure.

FIG. 2B depicts an example node 210-1 of a wearable device 200 consistent with some embodiments of the disclosure. Example node 210-1 may be one of a plurality of nodes 210. Node 210-1 may include the following: a power source 240 for providing power to various components of node 210-1; a haptic device 250 for providing haptic feedback to a user; a micro-system 260 for processing input and determining output; and a receiver 270 for receiving audio streams.

The node 210-1 may also include an outer shell 220 and a pivotable ring 230. The outer shell 220 may be permeable or semi-permeable to facilitate the passage of sound waves or visible light. The pivotable ring 230 may facilitate rotation within the node 210-1 (e.g., a plurality of rolling-element bearings, one or more gyros, one or more gimbals, a motored system). In some embodiments, node 210-1 may also include a transceiver 280 for sending and receiving data with a network. Transceiver 280 may be a wired transceiver configured to communicatively couple to a network wire such as band 212. Transceiver 280 may be a wireless transceiver configured to connect to a wireless network (e.g., local area network or a personal area network).

The power source 240 of node 210-1 may be a battery for storing electric energy. The power source 240 may be a hydrogen fuel cell, a capacitor, or any other relevant power storage device configured to power the various components of the node. The power source 240 may be configured to receive power through a contact-based wireless charger (not depicted) when placed adjacent to the charger.

The haptic device 250 may be a device configured to direct specific haptic feedback to a user. The haptic device 250 may be of a size and shape to facilitate placement within the node 210-1. For example, haptic device 250 may be 8 mm along the major axis of a brick-shaped haptic device. In another example, haptic device 250 may be 26 mm in diameter of a cylindrical haptic device. In yet another example, haptic device 250 may be a cylindrical device having a diameter of 14.05 mm and a thickness of 5.75 mm. Haptic device 250 may be an actuator, an actuator, a rotating vibrator, a linear resonant actuator, a brushless motor, a linear oscillating vibrator, a dual-axis oscillator, or any other relevant haptic structure. Haptic device 250 may be configured to provide feedback to a user without lights or other visual information. Haptic device 250 may operate discretely by providing a vibration, tapping sensation, or other haptic information to a user (e.g., a tapping sensation on the shoulder) without any audible alert.

Figure 4:
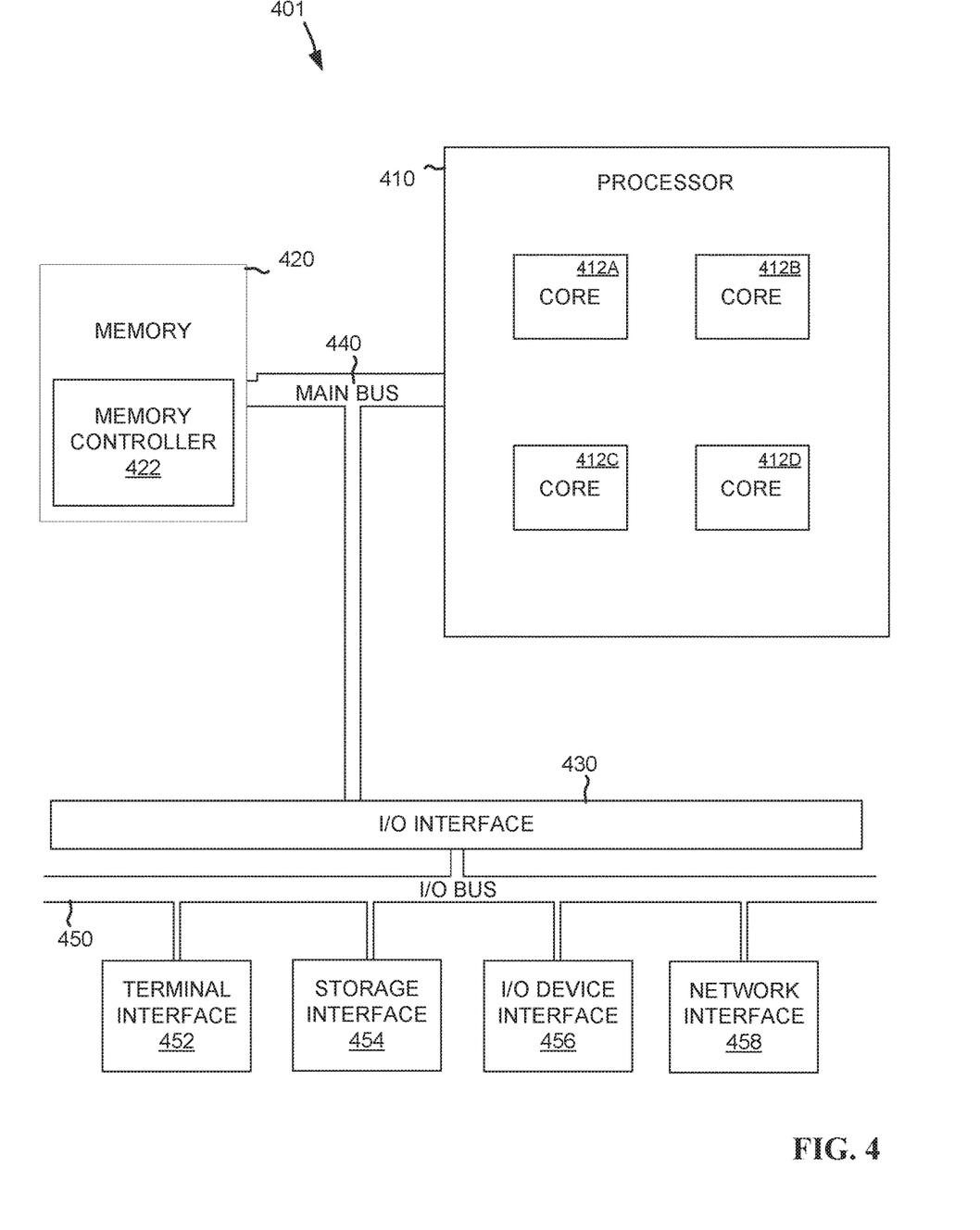
FIG. 4 depicts the representative major components of an example computer system that may be used, in accordance with some embodiments of the present disclosure.

The micro-system 260 of node 210-1 may be a miniature computer system. The micro-system 260 may configured as a system on a chip. (e.g., a silicon based integrated circuit having memory, storage, and input/output capabilities). FIG. 4, discussed in more detail below, depicts a computer system 401 consistent with some embodiments, that may be configured to operate as a micro-system 260. The micro-system 260 may communicate with the other components, determine that audio streams are directed to a user, and generate one or more responses to be performed (e.g., haptic feedback, sending images to a user's smartphone). In some embodiments, the micro-system 260 may perform natural language processing, to parse syllables, identify nonce elements, and other relevant natural language processing.

The receiver 270 of node 210-1 may be an audio receiver, such as a microphone, for recording audio streams of an environment (e.g., people, crashing sounds). The receiver 270 may be an audio/visual receiver, such as a microphone and camera combination. In some embodiments, receiver 270 may be two separate components (not depicted), including a first component for receiving audio and a second component for receiving video. The micro-system 260 may combine the microphone and camera data to analyze movement and facial expression of other people in combination with the sound. The receiver 270 may be activated based on location or voice recognition. For example, the node 210-1 may determine its location within a real-world environment by communicating with IoT location devices in an office. The transceiver 280 may receive the location and the micro-system 260 may activate receiver 270 to begin capturing audio streams, video streams, or both.

Figure 3:
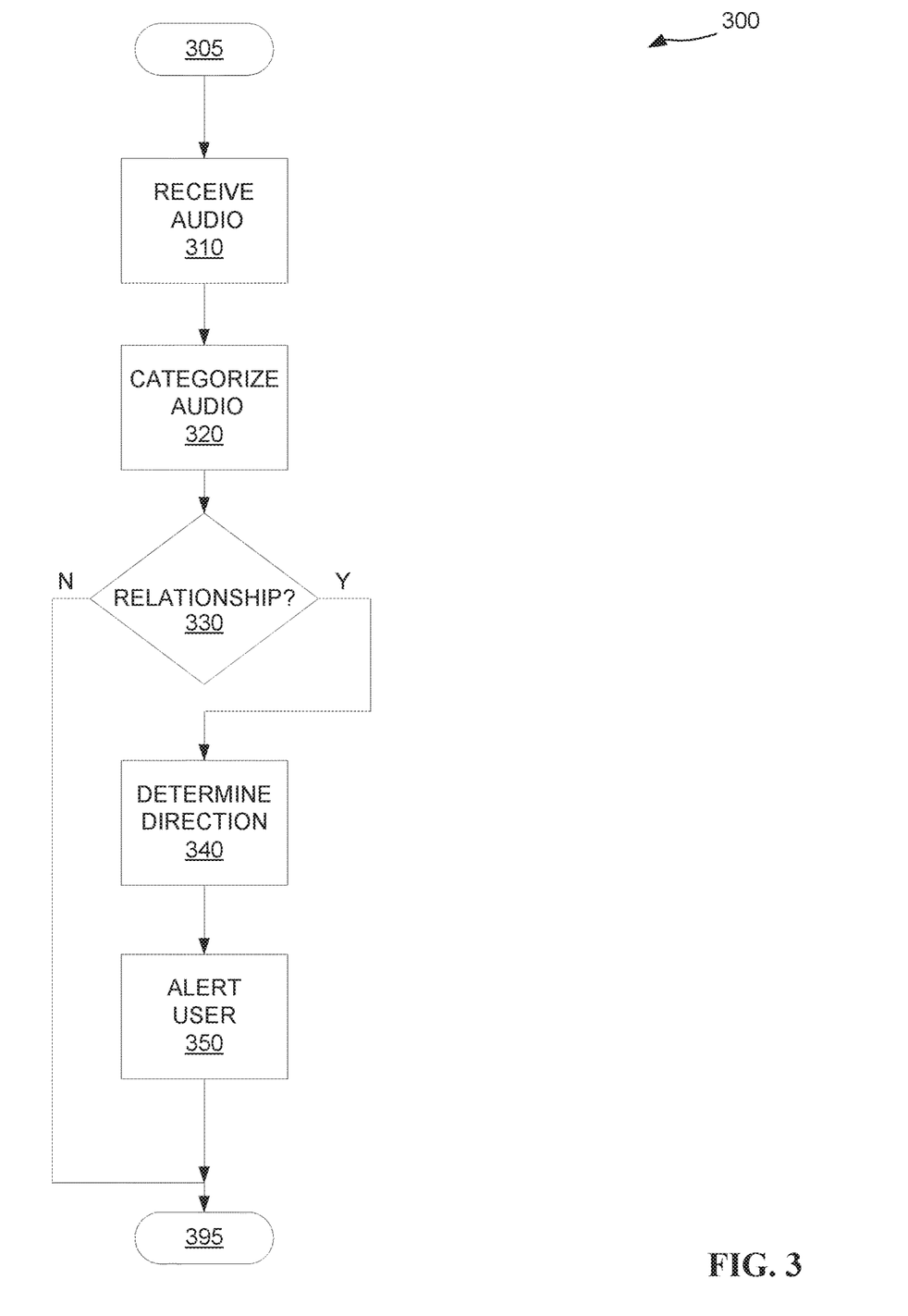
FIG. 3 depicts an example method for providing feedback to a user consistent with some embodiments of the disclosure.

FIG. 3 depicts an example method 300 for providing feedback to a user, consistent with some embodiments of the disclosure. Method 300 may be performed by a wearable device configured to alert a user of the world around the user, for example, the wearable device 200 described above. In some embodiments, each node 210 of the wearable device 200 may perform method 300, and certain steps or operations of method 300 may include communicating with or collaborating between the nodes 210 of the wearable device 200. Method 300 may be performed continuously or repeatedly (e.g., every 16.6 milliseconds, every second).

Method 300 starts at 305, when an audio stream is received at 310. The audio stream may be received by a microphone or other relevant audio receiver of a single node. The audio stream may be received by a plurality of microphones, each microphone associated with one of the plurality of nodes 210 of the wearable device 200. The audio stream may be in the form of sounds, such as a crash or a bang from a heavy widget dropping onto the ground. The audio stream may be in the form of speech or other audible words, such as a person saying "hello" or saying the name of the user.

At 320 the audio stream is categorized. Categorization of audio may include detecting a relationship between the audio stream and the user wearing the wearable device 200. In some embodiments, the audio stream may be categorized detecting a relationship by analyzing the waveform of the spoken audio. For example, a specific pitch range, a specific sound intensity, a range of sound intensities, the sound pressure in decibels, or the like.

Detecting a relationship may include performing natural language processing to determine that audible words relate to a user. For example, a user may have and identifier, such as a first name or a nickname, known by other individuals. At 320 performing relationship detection may include ingesting a stream of the received audio that includes spoken audio including the identifier of the user, and identifying that the audio is spoken audio. Performing relationship detection may also include performing secondary natural language processing to parse the spoken audio and isolate words and phrases. Based on determining the nickname, the audio stream may then be categorized as related to the user (e.g., a relationship between the user and the audio). Other elements in the spoken audio may cause a determination of a relationship, such as "look out", "beware", "danger", "hey you", or another relevant spoken phrase that might cause a person to focus their attention in the direction of the spoken audio.

If there is a detected relationship, at 330: Y, a direction of the audio stream is determined at 340. The determination of direction may be based on receiving the audio stream by one microphone of the plurality of microphones. The determination of direction may be based on receiving the audio stream by a subset of the plurality of microphones. For example, two microphones of two nodes (a first node and a second node) may receive the audio stream and the direction may be determined based on the relative differences in the received audio stream. The determination may be based on using a time different of arrival, an angle of arrival, or another relevant technique. One of the first node or the second node may communicate to other nodes that they have received an audio stream. The communication may include a timestamp of reception of the audio stream. The other of the first node or the second node may respond to the communication by initiating a collaborative process. The collaborative process may include comparisons of received audio streams between all nodes that have received the audio stream. The comparison may include comparing the characteristics (strength, pressure, time of reception, timestamp) of the audio stream. Based on the collaborative process, a direction of the audio stream may be determined (e.g., based on the earliest timestamp).

At 350 a user may be alerted after determining the direction of the audio stream. The user may be alerted by generating an appropriate alert and outputting the alert through the wearable device or a secondary device (e.g., a smartphone screen, a smartphone haptic motor, a heads-up display of an augmented reality wearable glasses, or an amplified or augmented audio stream to a hearing aid). The alert may be selected based on the direction of the audio stream. The appropriate alert may be haptic feedback. For example, the alert may be output by a first haptic device of a first node of the plurality of nodes, the first node corresponding to the location of the audio stream. The alert may be output differently based on different situations. For example, the haptic feedback of a node of a wearable device may give a different pattern or haptic strength depending on the audio stream or the location of the user.

The appropriate alert may include a representation of the audio stream, such as a picture or text. The appropriate alert may be visual data—for example, a contact picture of a person that spoke to the user of the wearable device. In another example, a real-time image or video of a person that spoke to the user. The video of the person that spoke to the user may be sent to a smartphone and may allow the user to read lips based on the representation. The alert may include a combination of haptic feedback along with a representation such as a text collected and converted by a speech to text program.

The textual representation may be a simplification or summary of the audio stream. For example, a person speaking "Hey there Joe Smith" to another person in a room where a user is standing, and the user is not Joseph Smith. The textual representation may be "<NAME> called out!" and where <NAME> is a variable representative of the name of a person other than the user wearing the wearable device.

After an alert is output to the user at 350 (or after it is determined that the audio stream is not directed at the user at 330: N, method 300 ends at 395.

FIG. 4 depicts the representative major components of an example computer system 401 that may be used, in accordance with some embodiments of the present disclosure. It is appreciated that individual components may vary in complexity, number, type, and\or configuration. The particular examples disclosed are for example purposes only and are not necessarily the only such variations. The computer system 401 may comprise a processor 410, memory 420, an input/output interface (herein I/O or I/O interface) 430, and a main bus 440. The main bus 440 may provide communication pathways for the other components of the computer system 401. In some embodiments, the main bus 440 may connect to other components such as a specialized digital signal processor (not depicted).

The processor 410 of the computer system 401 may be comprised of one or more cores 412A, 412B, 412C, 412D (collectively 412). The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or more methods consistent with embodiments of the present disclosure. In some embodiments, the computer system 401 may contain multiple processors 410. In some embodiments, the computer system 401 may be a single processor 410 with a singular core 412.

The memory 420 of the computer system 401 may include a memory controller 422. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 422 may communicate with the processor 410, facilitating storage and retrieval of information in the memory 420. The memory controller 422 may communicate with the I/O interface 430, facilitating storage and retrieval of input or output in the memory 420.

The I/O interface 430 may comprise an I/O bus 450, a terminal interface 452, a storage interface 454, an I/O device interface 456, and a network interface 458. The I/O interface 430 may connect the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

Logic modules throughout the computer system 401—including but not limited to the memory 420, the processor 410, and the I/O interface 430—may communicate failures and changes to one or more components to a hypervisor or operating system (not depicted). The hypervisor or the operating system may allocate the various resources available in the computer system 401 and track the location of data in memory 420 and of processes assigned to various cores 412. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A wearable device comprising:
   a plurality of microphones; and
   a plurality of processors, the plurality of processors communicatively coupled to the plurality of microphones,
   wherein at least one processor of the plurality of processors is positioned in front of the user,
   wherein at least a second processor of the plurality of processors is positioned in back of the user,
   wherein at least a third processor of the plurality of processors is positioned to the left side of the user,
   wherein at least a fourth processor of the plurality of processors is positioned to the right side of the user,
   wherein each processor of the plurality of processors is configured to:
      receive an audio stream from a subset of one or more of the plurality of microphones;
      detect, based on the audio stream from the plurality of microphones, a relationship between the audio stream and a user associated with the wearable device;
      determine, based on the audio stream from the plurality of microphones, a direction of the audio stream, wherein the determination is performed by the subset of the plurality by comparing a first timestamp received by a first microphone of the subset to a second timestamp received by a second microphone of the subset; and
      output, based on the direction of the audio stream and based on the relationship between the audio stream and the user, an alert to the user via the wearable device.

2. The wearable device of claim 1, further comprising:
   a plurality of haptic devices, the plurality of haptic devices coupled to the plurality of processors, the plurality of haptic devices configured to provide haptic feedback to the user;
   wherein at least one processor of the plurality of processors is further configured to:
      cause at least one haptic device of the plurality of haptic devices to provide haptic feedback to the user, wherein the at least one haptic device corresponds to the direction of the audio stream.

3. The wearable device of claim 1, wherein the output of the alert to the user further comprises:
communicating with a mobile device associated with the user.

4. The wearable device of claim 3, wherein the alert includes a representation of the audio stream.

5. The wearable device of claim 4, wherein the representation of the audio stream is visual.

6. The wearable device of claim 4, further comprising:
a plurality of cameras, the plurality of cameras communicatively coupled to the processor, the plurality of cameras configured to capture visual data;
wherein at least one processor of the plurality of processors is further configured to:
record the visual data of at least one camera of the plurality of cameras, wherein the at least one camera corresponds to at least one microphone of the plurality of microphones;
generate a representation of the visual data; and
provide the representation of the visual data to the mobile device of the user.

7. The wearable device of claim 6, wherein the representation of the visual data includes the visual data.

8. The wearable device of claim 6, wherein the representation of the visual data is an image representing a particular person.

9. The wearable device of claim 1, wherein the audio stream includes audible words, and wherein at least one processor the plurality of processors is further configured to:
perform a natural language processing operation regarding the audible words.

10. The wearable device of claim 9, wherein the audible words include a name of the user, and wherein the alert to the user wearing the wearable device includes an indication that the name of the user was spoken.

11. A method comprising:
receiving an audio stream from at least a first microphone of a plurality of microphones;
detecting, in response to receiving the audio stream, a relationship between the audio stream and a user, the user wearing the plurality of microphones and a plurality of processors, wherein each processor is microsystem, wherein each processor of the plurality of processors communicatively couple to a corresponding microphone of the plurality of microphones;
determining, based on the received audio stream, a direction of the audio stream, wherein the determination is performed by a subset of the plurality by comparing a first timestamp received by a first microphone of the subset to a second timestamp received by a second microphone of the subset; and
outputting, based on the direction of the audio stream and based on the relationship between the audio stream and the user, an alert to the user.

12. The method of claim 11, further comprising:
receiving audio from at least a second microphone of the plurality of microphones.

13. The method of claim 12, wherein:
each processor of the plurality of processors and each corresponding microphone of the plurality of microphones is in a discrete node of a plurality of nodes of a wearable device worn by the user;
the direction of the audio stream is further based on an earliest reception timestamp; and
the method further comprises:
determining, based on the receiving the audio stream from the first microphone and based on the receiving the audio stream from the second microphone, the earliest reception timestamp.

14. The method of claim 13, wherein:
each of the plurality of nodes includes a haptic device of a plurality of haptic devices of the wearable device, and
the outputting of the alert to the user further comprises:
causing, based on the determining the earliest reception timestamp, a first haptic device of the plurality of haptic devices to provide haptic feedback to the user, wherein the first haptic device corresponds to the direction of the audio stream.

15. A computer program product, the computer program product comprising a computer readable storage medium having program instructions embodied therewith, the program instructions configured to:
receive an audio stream from one or more of a plurality of microphones of a wearable device, wherein each microphone of the plurality of microphones corresponds to a self-contained wearable node of a plurality of self-contained wearable nodes of the wearable device, wherein the wearable device includes a plurality of software processors, wherein each processor of the plurality of software processors corresponds to a self-contained wearable node of the plurality of self-contained wearable nodes of the wearable device, wherein each processor of the plurality of software processors located in a given self-contained wearable node communicatively couples to a corresponding microphone of the plurality of microphones in the given self-contained wearable node of the plurality of self-contained wearable nodes;
detect, based on the audio stream from the plurality of microphones, a relationship between the audio stream and a user associated with the wearable device, wherein the detect the relationship comprises forming a wireless personal area network between each self-contained wearable node of the plurality of self-contained wearable nodes of the wearable device;
determine, based on the audio stream from the plurality of microphones and by a subset of the software processors of the plurality, a direction of the audio stream wherein the determination is based on transferring, by the wireless personal area network the audio stream from a first self-contained wearable node of the plurality to a second self-contained wearable node of the plurality, and wherein the second self-contained wearable node is a part of the subset; and
output, based on the direction of the audio stream and based on the relationship between the audio stream and the user, an alert to the user via the wearable device.

16. The computer program product of claim 15, wherein the program instructions are further configured to:
cause at least one haptic device of a plurality of haptic devices to provide haptic feedback to the user, wherein the at least one haptic device corresponds to the direction of the audio stream.

17. The computer program product of claim 15, wherein the output the alert to the user further comprises:
communicating with a mobile device associated with the user.

18. The computer program product of claim 15, wherein the alert includes a representation of the audio stream.

19. The computer program product of claim 18, wherein the representation of the audio stream is visual.

20. The computer program product of claim 15, wherein:
the audio stream includes audible words; and
the program instructions are further configured to perform a natural language processing operation regarding the audible words.

\* \* \* \* \*